United States Patent [19]
Morris

[11] Patent Number: 5,850,957
[45] Date of Patent: Dec. 22, 1998

[54] VEHICLE BUSINESS CARD DISPENSER

[75] Inventor: Victor Y. Morris, Milwaukee, Wis.

[73] Assignee: Vehicle Pockets, Inc., Milwaukee, Wis.

[21] Appl. No.: 649,312

[22] Filed: May 17, 1996

[51] Int. Cl.$^6$ ................................................. B60R 11/00
[52] U.S. Cl. .................... 224/277; 224/482; 224/547; 224/555; 224/566; 224/901; 224/901.6; 40/591; 220/481
[58] Field of Search ................................. 224/482, 277, 224/547, 555, 559, 560, 561, 566, 901, 901.6; 248/205.3, 221.12, 222.41, 223.21; 220/481; 40/591, 593, 594; 206/806

[56] References Cited

U.S. PATENT DOCUMENTS

| | | | |
|---|---|---|---|
| 1,657,049 | 1/1928 | Van Sicklen, Jr. | 224/547 |
| 1,739,801 | 12/1929 | Pitts | 224/277 |
| 1,790,977 | 2/1931 | De Boer | 224/547 |
| 2,608,294 | 8/1952 | Ward | 220/481 |
| 4,100,684 | 7/1978 | Berger | 248/205.3 |
| 4,209,108 | 6/1980 | Winans | 221/6 |
| 4,471,885 | 9/1984 | Mucciarone | 221/155 |
| 4,792,058 | 12/1988 | Parker | 221/232 |
| 4,887,739 | 12/1989 | Parker | 221/232 |
| 4,889,268 | 12/1989 | Shubeck | 224/482 |
| 5,069,376 | 12/1991 | Barel | 224/277 |
| 5,271,502 | 12/1993 | Chang | 206/425 |
| 5,595,300 | 1/1997 | Paiki et al. | 206/449 |
| 5,645,203 | 7/1997 | Tappenden | 224/277 |

FOREIGN PATENT DOCUMENTS

| | | | |
|---|---|---|---|
| 2458 | 6/1881 | United Kingdom | 40/593 |

*Primary Examiner*—Linda J. Sholl
*Attorney, Agent, or Firm*—Nilles & Nilles

[57] ABSTRACT

A business card dispenser, mountable on an exterior surface of a vehicle used by a business person, stores business cards or other promotional materials and is accessible to prospective customers located in the vicinity of the vehicle so as to permit the prospective customers to remove promotional materials from the business card dispenser. The business card dispenser preferably includes 1) a base mountable on the vehicle, e.g, by adhesive strips and 2) a card holder mounted on the base and receiving the promotional materials. The card holder is preferably removably mounted on the base to permit its removal, thus preventing theft or damage to the card holder. The card holder also incorporates measures to protect the cards from the elements. Indicia preferably are provided on the vehicle in the vicinity of the business card dispenser to draw prospective customers' attention to the business card dispenser.

19 Claims, 2 Drawing Sheets

VEHICLE BUSINESS CARD DISPENSER

BACKGROUND OF THE INVENTION

1. Field of the Invention

The invention relates to business card dispensers and, more particularly, to 1) a business card dispenser configured for mounting on an exterior surface of a vehicle so as to permit a business person operating the vehicle to store and distribute promotional materials and 2) the combination of a vehicle and a business card dispenser mounted thereon.

2. Discussion of the Related Art

A variety of businesses print promotional materials on vehicles in an attempt to attract prospective customers. For instance, plumbers, electricians, heating and air conditioning repair specialists, and myriad other technicians and other professionals print their companies' names and telephone numbers on the side of their automobiles, vans, pick-up trucks, etc. The people who are the most likely to see and take interest in this promotional information are those who pass by the vehicle while the vehicle is parked and the business person operating the vehicle is inside a business or residence or otherwise is not near the vehicle. Prospective customers who are interested in contacting the business person must either write the telephone number and/or other pertinent information on a piece of paper or attempt to memorize this information. Either procedure requires substantial effort on the part of the prospective customer and significantly reduces the chances that he or she will successfully make contact with the business person.

This disadvantage of conventional promotional techniques could conceivably be alleviated if business cards or other portable promotional materials were made available to prospective customers. However, such promotional materials heretofore were available only from the business person directly or were locked inside his or her vehicle when he or she was away from the vehicle, thereby rendering them inaccessible to most prospective customers.

Dispensers and holders for business cards and other promotional materials are, of course, available. However, all such dispensers known by the inventor are designed to be carried by the business person or otherwise are ill-suited for mounting on an exterior surface of a vehicle. Examples of such dispensers are disclosed, for instance, in U.S. Pat. Nos. 4,887,739 and 4,792,058 to Parker, U.S. Pat. No. 4,471,885 to Mucciarone, and U.S. Pat. No. 4,209,108 Winans.

OBJECTS AND SUMMARY OF THE INVENTION

It is therefore a first primary object of the invention to provide a dispenser for business cards or other promotional materials which is configured for mounting on an exterior surface of a vehicle thereby to facilitate the conveyance of information about a business to prospective customers who have access to the vehicle.

A first secondary aspect of the invention is to provide a business card dispenser which meets the first primary object of the invention and which is simple and inexpensive to manufacture and to install on the vehicle, thereby rendering it economical to use and easy to install.

In accordance with a first aspect of the invention, this object is achieved by providing a vehicle business card dispenser comprising a base configured for mounting on an exterior surface of a vehicle, and a card holder mounted on the base. The card holder includes 1) a box mounted on the base, the box having an opening formed therein, and 2) a lid movable from a first position covering the opening to a second position rendering the opening accessible for insertion and removal of promotional literature.

Another secondary object of the invention is to provide a business card dispenser which meets the first primary object of the invention and at least a portion of which is removable from the vehicle to prevent theft of or damage to the business card dispenser.

In accordance with a second aspect of the invention, this object is achieved by designing the box to be detachably mountable on the base. Preferably, a plurality of mounting brackets are located on one of 1) a rear surface of the rear wall of the box and 2) the front surface of the plate, each of the mounting brackets having a keyhole slot formed therein. A plurality of mounting screws preferably extend from the other of 1) the rear surface of the rear wall of the box and 2) the front surface of the plate. Each of the mounting screws is removably received in a corresponding one of the keyhole slots.

Yet another secondary object of the invention is to provide a business card dispenser which meets the first primary object of the invention and which protects the promotional materials stored therein when the vehicle is in transit and/or is exposed to the elements while concurrently permitting relatively easy access to the promotional materials by prospective customers.

In accordance with another aspect of the invention, a lid covers the box of the card holder. The lid is generally L-shaped and comprises 1) a first leg having front and rear edges, the first leg being hingedly attached to the rear wall of the box, and 2) a second leg extending generally perpendicularly from the front edge of the first leg. The lid is pivotable about the hinge to move the lid from the first position to the second position. When the lid is in the first position, the first leg covers the opening and the second leg overlaps and is generally parallel with the front wall of the box. Splash guards may extend downwardly from side edges of the first leg of the lid and overlap the side walls of the box when the lid is in the first position.

Yet another secondary object of the invention is to permit prospective customers to view promotional materials stored in the business card dispenser even when the dispenser is closed.

In accordance with yet another aspect of the invention, this object is achieved by forming at least a front wall of the box from a transparent material.

A second primary object of the invention is to provide a combination of a vehicle suitable for receiving a business card dispenser meeting the first primary object of the invention and a business card dispenser which is mounted on the vehicle and which meets the first primary object of the invention.

In accordance with still another aspect of the invention, this object is achieved by providing a vehicle having an exterior surface, and a business card dispenser. The business card dispenser includes a base mounted on the exterior surface of the vehicle, and a card holder detachably mounted on the base. The card holder includes a box mounted on the base, the box having an opening formed therein, and a lid movable from a first position covering the opening to a second position rendering the opening accessible for insertion and removal of promotional literature.

Still another secondary object of the invention is to provide a combination which meets the second primary object of the invention and which includes indicia on the vehicle which draws prospective customers' attention to the business card dispenser.

In accordance with yet another aspect of the invention, this object is achieved by providing indicia on the surface of the vehicle which direct a prospective customer's attention to the business card dispenser. The indicia preferably is printed on stickers applied to the surface of the vehicle.

Other objects, features, and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout and in which.

DETAILED DESCRIPTION OF THE PREFERRED EMBODIMENT

1. Résumé

Pursuant to the invention, a business card dispenser is designed to be mounted on an exterior surface of a vehicle used by a business person, to store business cards or other promotional materials, and to be accessible to prospective customers located in the vicinity of the vehicle so as to permit the prospective customers to remove promotional materials from the business card dispenser. The business card dispenser preferably includes 1) a base mountable on the vehicle, e.g, by adhesive strips and 2) a card holder mounted on the base and receiving the promotional materials. The card holder is preferably removably mounted on the base to permit its removal, thus preventing theft or damage to the card holder. The card holder also incorporates measures to protect the cards from the elements. Indicia preferably are provided on the vehicle in the vicinity of the business card dispenser to draw prospective customers' attention to the business card dispenser.

2. Construction and Use of Business Card Dispenser

Figure 1:
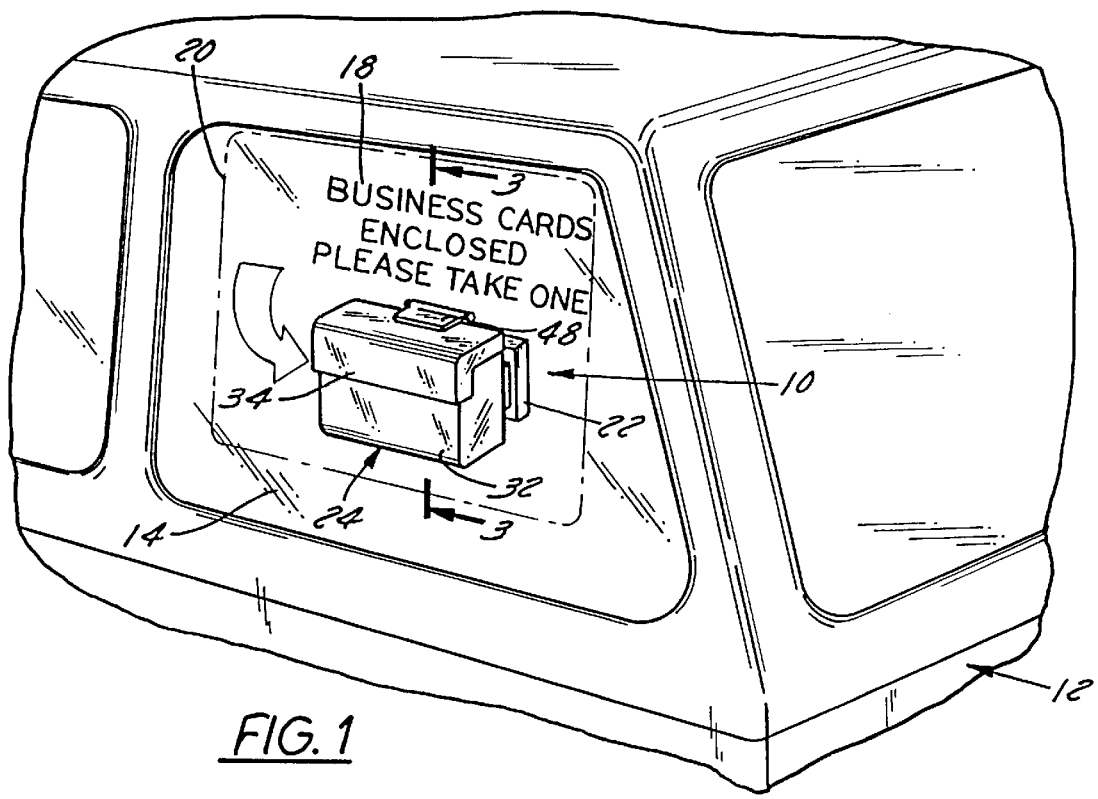
FIG. 1 is a perspective view of a portion of a vehicle and of a business card dispenser and accompanying indicia mounted on the vehicle, showing the business card dispenser in a first, closed position.
Figure 2:
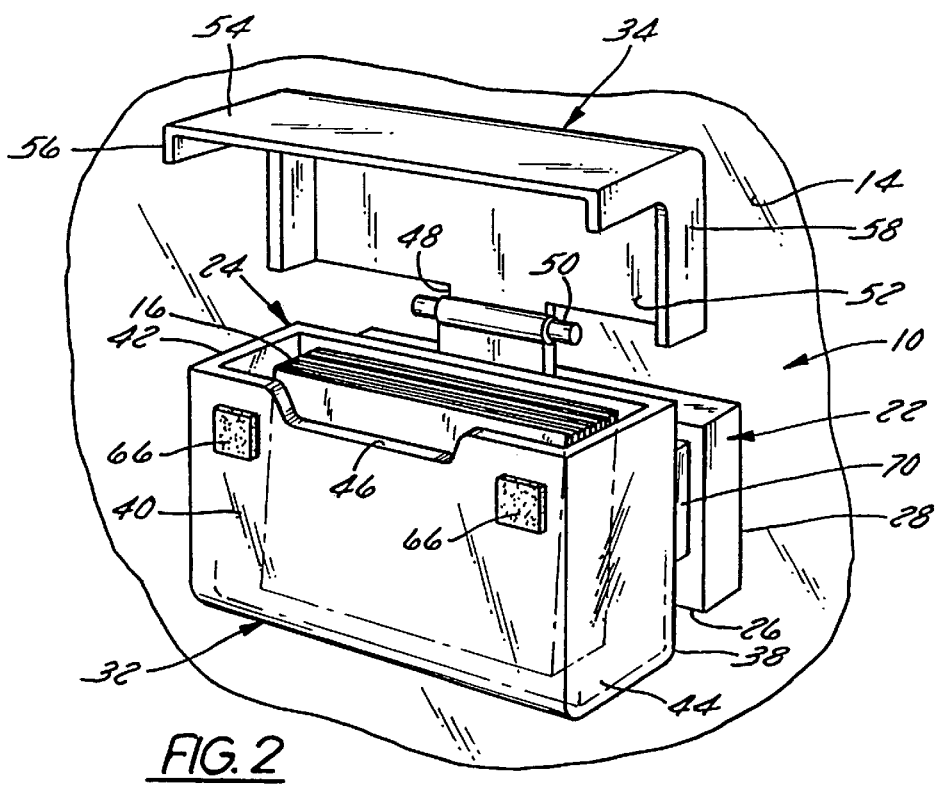
FIG. 2 is an enlarged perspective view showing the business card dispenser and accompanying portion of the vehicle in FIG. 1 and illustrating the business card dispenser in an second, open position.

Turning now to the drawings and initially to FIG. 1 in particular, a business card dispenser 10 is configured for mounting on an exterior surface, preferably a sidewall 14, of a vehicle 12 at a location which is eye-catching to prospective customers for goods or services offered by the business person operating the vehicle 12. The term "sidewall" as used herein is intended to encompass both a window as illustrated or a metallic surface. Indicia 18, preferably printed on adhesive sticker(s) 20 and taking the form of words and/or arrows or other attention attracting indicia, is preferably mounted on the vehicle 12 in the vicinity of the business card dispenser 10 to draw prospective customers' attention to the business card dispenser 10.

Referring now to all of the drawings, business card dispenser 10 includes a base 22 which is mountable on the vehicle surface 14 and a card holder 24 mounted on the base 22. The illustrated business card dispenser 10 is dimensioned and configured to store and dispense business cards 16 of standard dimensions. It is envisioned, however, that dispensers of essentially identical construction but of different dimensions and possibly different proportions could be used to store and dispense loose leaf flyers and other promotional literature.

The base 22 may comprise any device capable of supporting the card holder 24. The illustrated base 22 comprises a simple rectangular extruded plastic plate having front and rear surfaces 26 and 28. Adhesive strips 30 (FIG. 3), secured to the rear surface 28 of the base 22, provide an effective mechanism for permanently or semi-permanently mounting the base 22 on the surface 14 of the vehicle 12 without in any way breaching the integrity of the surface 14 and without requiring any modifications of the vehicle 12. Conventional adhesive strips 30 having a peel-off backing are well suited for this purpose.

The card holder 24 comprises a box 32 and a lid 34. The box 32, which is generally rectangular in shape, includes a floor 36, a rear wall 38, a front wall 40, and a pair of opposed side walls 42, 44 each of which is attached to the front wall 40, the rear wall 38, and the floor 36. The top of the box 32 is open to present an opening for the insertion and removal of business cards 16. The floor 36 and walls 38, 40, 42 and 44 of the box 32 can be formed from any suitable waterproof, relatively rigid material. In the illustrated embodiment, the floor 36 and all of the walls 38, 40, 42, and 44 are formed from a conventional extruded plastic material, with the front wall 40, floor 36, and rear wall 38 being formed from a single U-shaped member. The side walls 42 and 44 have a complimentary U-shape and are bonded or otherwise immovably affixed to the ends of the U-shaped member. The smooth corners presented by these mating U-shaped members eliminate any sharp edges which could snag the clothing or injure passers-by and also present an aesthetically-pleasing appearance. A notch 46 is formed in the upper end of the front wall 40 to permit insertion of a prospective customers' fingers for reasons detailed below. Advantageously, at least the front wall 40, and possibly all walls, of the box 32 can be formed from a transparent material to permit prospective customers to view the business cards 16 without opening the box 32.

The lid 34 is designed to prevent business cards 16 from blowing out of the box 32 when the vehicle 12 is in transit and to protect the business cards 16 from the elements while providing relatively uninhibited access to the interior of the box 32, thereby to facilitate withdrawal of business cards 16. Towards these ends, the lid 34 is attached to the box by a hinge 48 so as to be movable from a first position covering the opening to a second position rendering the opening accessible for the insertion and removal of business cards 16. The hinge 48 preferably is configured to present a pivot axis 50 which is located above the upper end of the box 32 such that the lid 34 is flush with and rests on the upper edges of the walls 38, 40, 42, and 44 of the box 32 when in its closed position. Configuring the lid 34 to rest flush on the walls in this manner enhances the aesthetic appearance of the box 32 and also inhibits the admission of moisture into the box 32.

The illustrated lid 34 is generally L-shaped, having a first leg 52 and a second leg 54. The first leg 52 has a rear edge which is co-extensive with the rear surface of the rear wall 38 of the box 32 when the lid 34 is closed. The second leg 54 extends at least generally perpendicularly from the front edge of the first leg 52. In the illustrated embodiment, the second leg 54 is formed integrally with the first leg 52. When the box 32 is in its closed position, the first leg 52 extends substantially horizontally and covers the opening, and the second leg 54 extends substantially vertically and overlaps and is generally parallel with the front wall 40 of the box 32. Splash guards 56, 58, preferably formed integrally with the remainder of the lid 34, extend from side edges of the legs 52 and 54 to overlap the side walls 42, 44 of the box 32 when the lid 34 is closed, thereby to provide an additional moisture barrier between the ambient atmosphere and the interior of the box 32. If desired, an elastomeric gasket or some other seal could be provided around the periphery of the first leg 52 and/or on the upper edges of the walls 38, 40, 42, and 44 to provide an additional moisture barrier.

A latch mechanism is preferably provided for selectively latching the lid 34 in its closed position. The latch mechanism should be capable of holding the lid 34 in its closed position under forces normally imposed on the lid 34 by wind and vibrations while the vehicle 12 is traveling but should be relatively easy to operate so as not to hinder access to the inside of the box 32 by prospective customers. The latch mechanism also should be relatively small so as not to interfere with business card viewing, and relatively simple so as not to unnecessarily increase the cost of the business card dispenser 10. The inventor has found that simple hook-and-loop fasteners work well for this purpose. In the illustrated embodiment, two mating sets 60, 62 of hook-and-loop fasteners are provided, one adjacent each end of the card holder 24. Each set 60, 62 comprises 1) a first hook-and-loop fastener 64 mounted on the rear surface of the second leg 54 of the lid 34 and 2) a second, mating hook-and-loop fastener 66 mounted on the front surface of the front wall 40 of the box 32.

Figure 3:
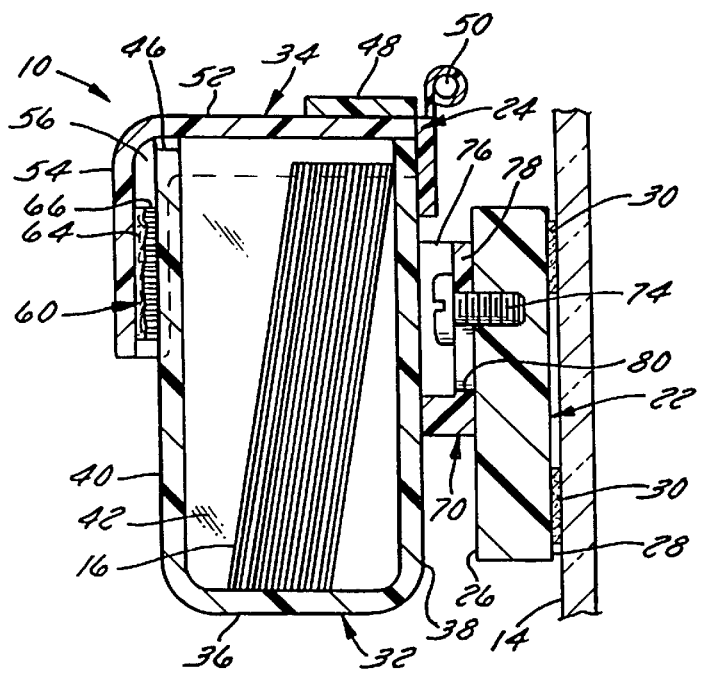
FIG. 3 is a side sectional elevation view taken along the lines 3—3 in FIG. 1.
Figure 4:
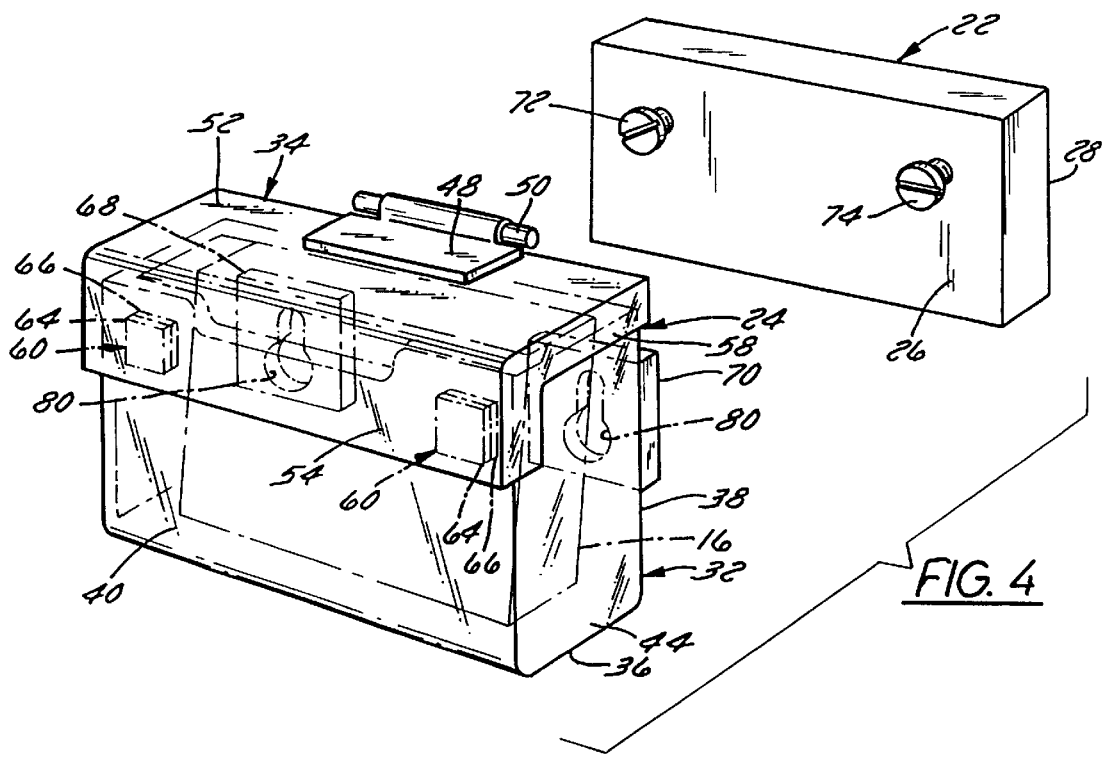
FIG. 4 is a partially exploded perspective view of the business card dispenser of FIG. 1, with the card holder of the business card dispenser removed from the accompanying base.

It is conceivable that the card holder 24 could be permanently mounted on the base 22. However, the card holder 24 is preferably removably attached to the base 22 so as to permit its removal when the vehicle 12 is being washed or is subjected to other conditions in which the business card dispenser 10 or the business cards 16 stored therein might be damaged or when the business person has reason to fear theft or vandalism of the business card dispenser 10. In the illustrated embodiment, detachable mounting of the card holder 24 on the base 22 is made possible by 1) mounting brackets 68, 70 which are mounted near the ends of the rear surface of the rear wall 38 of the box 32 and 2) mounts 72, 74 which are mounted on the front surface 26 of the base 22 so as to be alignable with the mounting brackets 68, 70. Since each of the mounting brackets 68, 70 is of identical construction, only the mounting bracket 70 will be described with reference to FIG. 3. Mounting bracket 70 comprises 1) a generally U-shaped support portion 76 bonded or otherwise affixed to the imperforate rear surface of the rear wall 36 of the box 32, 2) a rectangular plate located on and preferably formed integrally with the U-shaped support portion 76, and 3) a keyhole slot 80 formed through a central portion of the rectangular plate 78. The keyhole slot 80 presents a lower, relatively large receiving portion and an upper, relatively small holding portion which defines a receptacle for a respective mount 72 or 74 and which, as best seen in FIG. 3, is spaced from the rear wall 38 of the box 32.

The mounts 72, 74 preferably comprise a pair of horizontally-aligned mounting screws threaded into the base 22 so as to be alignable with the keyhole slots 80 in the mounting brackets 68, 70. During mounting, the heads of the screws 72, 74 first pass through the lower receiving portion of the keyhole slots 80, and the card holder 24 is then lowered to a position in which the shaft of each screw 72, 74 is surrounded by the holding portion of the respective slot 80. Transverse movement of the card holder 24 away from the base 22 is prevented by engagement of the rear surfaces of the screw heads with the front surface of the rectangular plates 78.

It should be noted that the mounting brackets 68, 70 could be located on the base 22 and that the mounts or mounting screws 72, 74 could be located on the card holder 24. However, the illustrated arrangement is preferred because the base 22 is better-suited for threadedly receiving the screws 72, 74 than is the card holder 24.

The business card dispenser 10 is used as follows:

First, the base 22 is mounted on a sidewall 14 or other exterior surface of a business vehicle 12 using the adhesive strips 30. Indicia 18 may also be applied to the vehicle 12 at this time to draw prospective customers' attention to the business card dispenser 10. The box 32 is then filled with business cards 16, and the card holder 24 is detachably mounted on the base 22 using the brackets 68, 70 and mounting screws 72, 74. Business cards 16 in the box are protected from the elements, both when the vehicle 12 is traveling along the highway and when it is at rest, by the lid 34 and by the splash guards 56, 58 at the edges of the lid 34. The business person operating the vehicle 12 then goes about his or her business which would typically include service calls. Prospective customers who are attracted to the business card dispenser 10 by the surrounding indicia 18 will notice that there are business cards 16 in the card holder 24 without opening it because of the transparent body of the box 32. A prospective customer can then open the box 32 simply by separating the mating hook-and-loop fasteners 66, 68 and by swinging the lid 34 about the hinge 48. The prospective customer can then remove a card 16 from the box 32 using his or her fingers, with insertion of the fingers being facilitated by the notch 46 in the upper end of the front wall 40 of the box 32. If the business person is afraid that the business card dispenser 10 might be damaged or the business cards 16 stolen, or if he or she is simply finished for the day and does not wish to leave the card holder 24 on the vehicle 12, he or she removes the card holder 24 from the base 22 and stores it in a convenient location such as the interior of the vehicle 12 until the next use.

Many changes and modifications could be made to the invention without departing from the spirit thereof. For instance, the card dispenser could be mounted on a surface of a building or other structure instead of a vehicle. Other changes and modifications were discussed above. Others will become apparent from the appended claims.

I claim:

1. In combination:
   (A) a vehicle having an external surface; and
   (B) a vehicle business card dispenser including
      (1) a base;
      (2) an adhesive via which said base is fixedly mounted on said exterior surface of of said vehicle; and
      (3) a business card holder detachably mounted on said base, said business card holder including a rigid box formed from a plurality of immovably interconnected walls including a front wall and a rear wall, said box being detachably mounted on said base and having an upwardly-facing opening formed therein between said front wall and said rear wall for the insertion and removal of business cards; and a lid movable 1) from a first position covering said opening and overlapping at least a portion of said front wall of said box 2) to a second position rendering said opening accessible for insertion and removal of business cards.

2. A combination as defined in claim 1, wherein said base comprises a generally rectangular plate having a rear surface mountable on a sidewall of said structure and having a front surface disposed opposite said rear surface, wherein said box is generally rectangular in shape and includes a floor, said rear wall, said front wall, and a pair of opposed side walls each of which is attached to said front wall, said rear wall, and said floor, said opening being formed from an open top surface of said box, and wherein said rear wall of said box is detachably mounted on said front surface of said plate.

3. A combination as defined in claim 2, wherein said rear wall of said box is imperforate, and further comprising a plurality of mounting brackets affixed to and extending rearwardly from a rear surface of said rear wall of said box, each of said mounting brackets defining a receptacle which is spaced from said rear wall of said box; and a plurality of mounts affixed to and extending forwardly from said front surface of said plate, each of said mounts being removably received in a corresponding one of said receptacles said mounts and said mounting brackets being dimensioned and configured such that said box is movable vertically with respect to said plate to a position in which said mounts are locked within said receptacles to prevent transverse movement of said box relative to said plate.

4. A combination as defined in claim 1, wherein said box is generally rectangular in shape and includes a floor, wall, said front wall, and a pair of opposed side walls each of which is attached to said front wall, wall, and said floor, said opening being formed from an open top surface of said box.

5. A business card dispenser as defined in claim 4, wherein a notch is formed in an upper end of said front wall of said box to facilitate insertion of a person's fingers into said box.

6. A combination as defined in claim 1, wherein at least said front wall of said box is transparent.

7. In combination:

(A) a vehicle having an external surface; and (B) a vehicle business card dispenser including (1) a base mounted on said exterior surface of said vehicle; and (2) a card holder mounted on said base, said card holder including a box having an opening formed therein; and a lid movable from a first position covering said opening to a second position rendering said opening accessible for insertion and removal of business cards, wherein said base comprises a generally rectangular plate having a rear surface mountable on a sidewall of said structure and having a front surface disposed opposite said rear surface, wherein said box is generally rectangular in shape and includes a floor, a rear wall, a front wall, and a pair of opposed side walls each of which is attached to said front wall, said rear wall, and said floor, said opening being formed from an open top surface of said box, wherein said rear wall of said box is detachably mounted on said front surface of said plate, wherein said lid is generally L-shaped and comprises 1) a first leg having front and rear edges, said first leg being hingedly attached to said rear wall of said box, and 2) a second leg extending generally perpendicularly from said front edge of said first leg, wherein said lid is pivotable about said hinge to move said lid from said first position to said second position, and wherein when said lid is in said first position, said first leg covers said opening and said second leg overlaps and is generally parallel with said front wall of said box.

8. In combination:

(A) a vehicle having an external surface; and (B) a vehicle business card dispenser including (1) a base;

(2) an adhesive via which the base is fixedly mounted on said exterior surface of said vehicle; and (3) a business card holder detachably mounted on said base, said business card holder including a rigid box formed from a plurality of immovably interconnected walls, said box being detachably mounted on said base and having an opening formed therein for the insertion and removal of business cards; and a lid movable from a first position covering said opening to a second position rendering said opening accessible for insertion and removal of business cards, wherein said box is generally rectangular in shape and includes a floor, a rear wall, a front wall, and a pair of opposed side walls each of which is non-detachably attached to said front wall, said rear wall, and said floor, said opening facing upwardly and extending between said front wall and said rear wall, wherein said lid is generally L-shaped and comprises 1) a first leg having front and rear edges, said first leg being hingedly attached to said rear wall of said box and extending substantially horizontally when said lid is in said first position, and 2) a second leg extending generally perpendicularly from said front edge of said first leg and extending substantially vertically when said lid is in said first position, wherein said lid is pivotable about said hinge to move said lid from said first position to said second position, and wherein when said lid is in said first position, said first leg covers said opening and said second leg overlaps and is generally parallel with said front wall of said box.

9. A combination as defined in claim 8, further comprising a latch mechanism which selectively latches said lid in said first position.

10. A combination as defined in claim 9, wherein said latch mechanism comprises mating hook-and-loop fasteners mounted on a rear surface of said second leg of said lid and on a front surface of said front wall of said box.

11. A combination as defined in claim 8, further comprising splash guards which extend downwardly from side edges of said first leg of said lid and which overlap said side walls of said box when said lid is in said first position.

12. In combination:
(A) a vehicle including a sidewall having an external surface; and
(B) a vehicle business card dispenser including
  (1) a base comprising a plate having a front surface and a rear surface;
  (2) adhesive strips, mounted on said rear surface of said plate, which fixedly attach said plate to said exterior surface of said sidewall of said vehicle;
  (3) a pair of mounts affixed to extending forwardly from said front surface of said plate;
  (4) a card holder mounted on said base, said card holder including
    a generally rectangular box formed from a transparent plastic material and having an upper opening for receiving promotional materials, said box including a floor, an imperforate rear wall, a front wall, and a pair of opposed side walls each of which is immovably attached to said front wall, said rear wall, and said floor, wherein a notch is formed in a central portion of an upper end of said front wall of said box to facilitate insertion of a person's fingers into said box, and wherein said upper opening is formed from an open upper surface of said box which extends between said front wall and said rear wall,
    a pair of mounting brackets affixed to and extending rearwardly from a rear surface of said rear wall of said box, each of said mounting brackets defining a receptacle which is spaced from said rear surface of said rear wall of said, each of said mounts being removably received in a corresponding one of said receptacles, said mounts and said mounting brackets being dimensioned and configured to such that said box is movable vertically with respect to said plate to a position in which said mounts are locked within said receptacles to prevent transverse movement of said box relative to said plate, and
    a generally L-shaped lid movable from a first position covering said opening to a second position rendering said opening accessible for insertion and removal of business cards, said lid including
      (a) a first leg having front and rear edges,
      (b) a second leg extending generally perpendicularly from said front edge of said first leg, wherein, when said lid is in said first position, said first leg extends substantially horizontally and covers said opening, said rear edge of said first leg is disposed generally co-planar with a rear surface of said rear wall of said box, and said second leg extends generally vertically and overlaps and is generally parallel with said front wall of said box, and
      (c) splash guards which extend downwardly from side edges of said first leg of said lid and which overlap said side walls of said box when said lid is in said first position, said splash guards extending generally vertically when said lid is in said first position,
    a hinge pivotally connecting a rear portion of said first leg of said lid to an upper portion of said rear wall of said box, wherein said lid is pivotable about said hinge to move said lid from said first position to said second position, and
    a latch mechanism which selectively latches said lid in said first position.

13. In combination:
(A) a vehicle having an exterior surface; and
(B) a business card dispenser including
  (1) a base;
  (2) an adhesive via which said base is fixedly mounted on said exterior surface of said vehicle; and
  (3) a card holder detachably mounted on said base, said card holder including
    (a) a box mounted on said base, said box having front and rear walls and an upwardly facing opening formed therein between said front wall and said rear wall; and
    (b) a lid movable 1) from a first position covering said opening and overlapping at least a portion of said front wall of said box 2) to a second position rendering said opening accessible for insertion and removal of business cards.

14. A combination as defined in claim 13, wherein
  said base comprises a generally rectangular plate having a rear surface mounted on said surface of said vehicle via said adhesive and having a front surface disposed opposite said rear surface,
  said box is generally rectangular in shape and includes a floor, said rear wall, said front wall, and a pair of opposed side walls each of which is immovably attached to said front wall, said rear wall, and said floor, and
  said rear wall of said box is detachably mounted on said front surface of said plate.

15. A combination as defined in claim 14, further comprising
  a plurality of mounting brackets located on one of 1) a rear surface of said rear wall of said box and 2) said front surface of said plate; and
  a plurality of mounts extending from the other of 1) said rear surface of said rear wall of said box and 2) said front surface of said plate, each of said mounts being removably received in a corresponding one of said mounting brackets.

16. A combination as defined in claim 13, further comprising indicia, provided on said surface of said vehicle, which direct a prospective customer's attention to said business card dispenser.

17. A combination as defined in claim 16, wherein said indicia is printed on stickers applied to said surface of said vehicle.

18. A combination as defined in claim 14, wherein
  said lid is generally L-shaped and comprises 1) a first leg having front and rear edges, said first leg being hingedly attached to said rear wall of said box and extending substantially horizontally when said lid is in said first position, and 2) a second leg extending generally perpendicularly from said front edge of said first leg and extending substantially vertically when said lid is in said first position,
  said lid is pivotable about said hinge to move said lid from said first position to said second position, and wherein
  when said lid is in said first position, said first leg covers said opening and said second leg overlaps and is generally parallel with said front wall of said box.

19. A combination as defined in claim 14, wherein said rear wall of said box is imperforate, and further comprising a plurality of mounting brackets affixed to and extending rearwardly from a rear surface of said rear wall of said box, each of said mounting brackets defining a receptacle which is spaced from said rear wall of said box; and a plurality of mounts affixed to and extending forwardly from said front surface of said plate, each of said mounts being removably received in a corresponding one of said receptacles, said mounts and said mounting brackets being dimensioned and configured such that said box is movable vertically with respect to said plate to a position in which said mounts are locked within said receptacles to prevent transverse movement of said box relative to said plate.

* * * * *